March 10, 1959 W. B. HERNDON 2,876,656
CONTROLLED COUPLING MULTISTEP AUTOMATIC TRANSMISSIONS
Filed Nov. 23, 1953 5 Sheets-Sheet 1

INVENTOR
Walter B. Herndon
BY
T. L. Chisholm
ATTORNEY

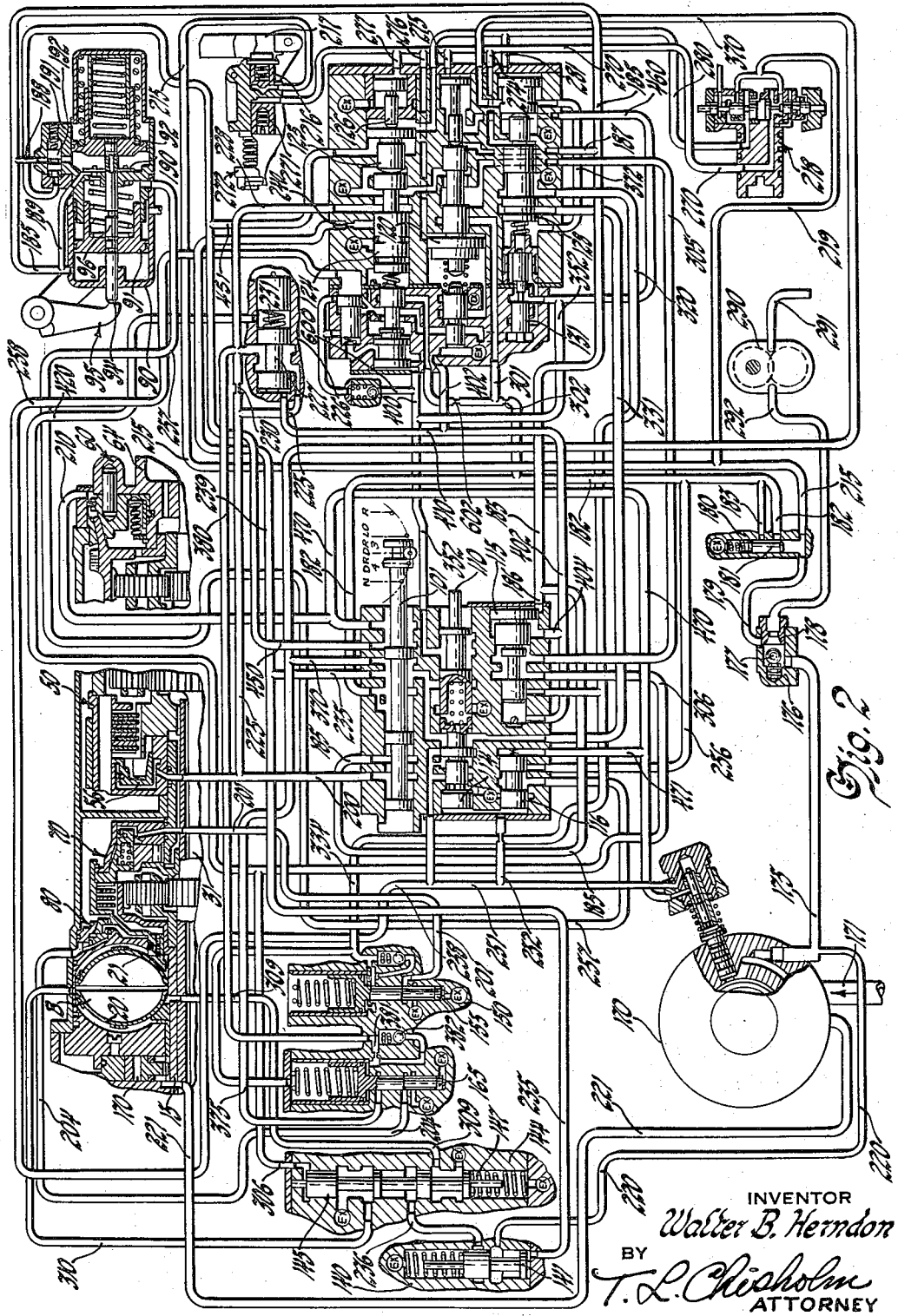

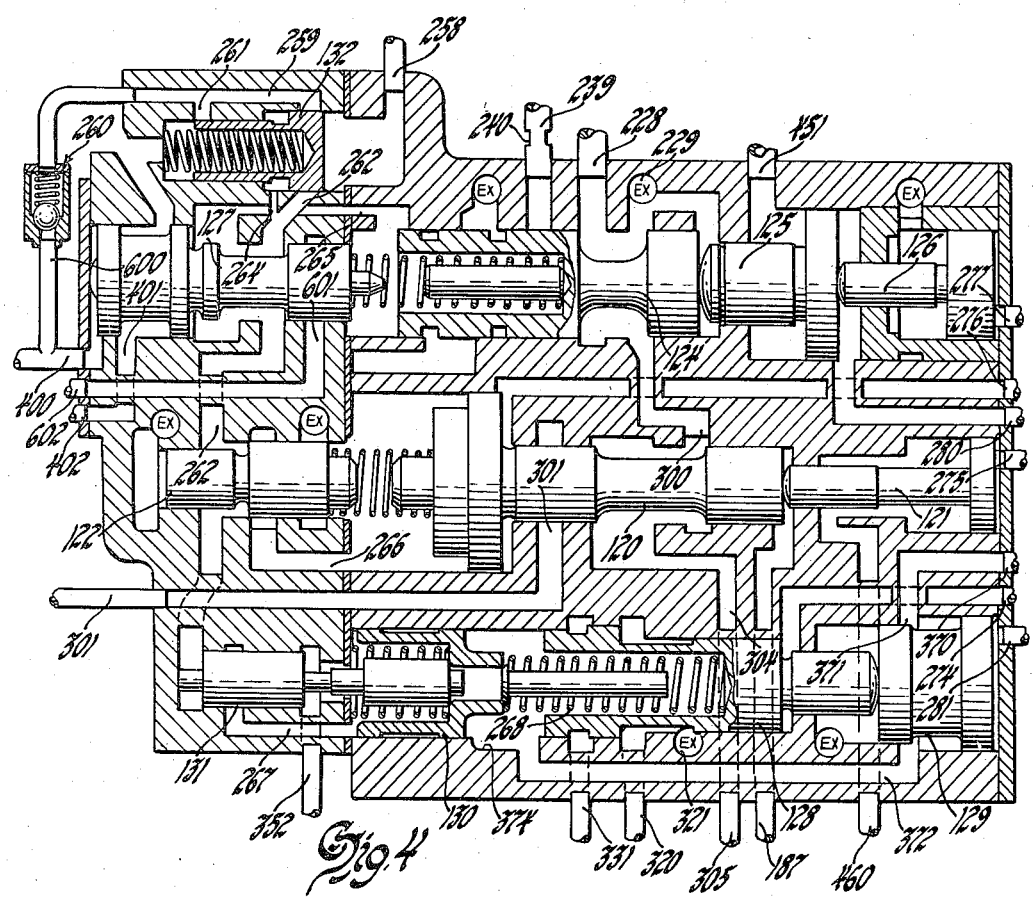

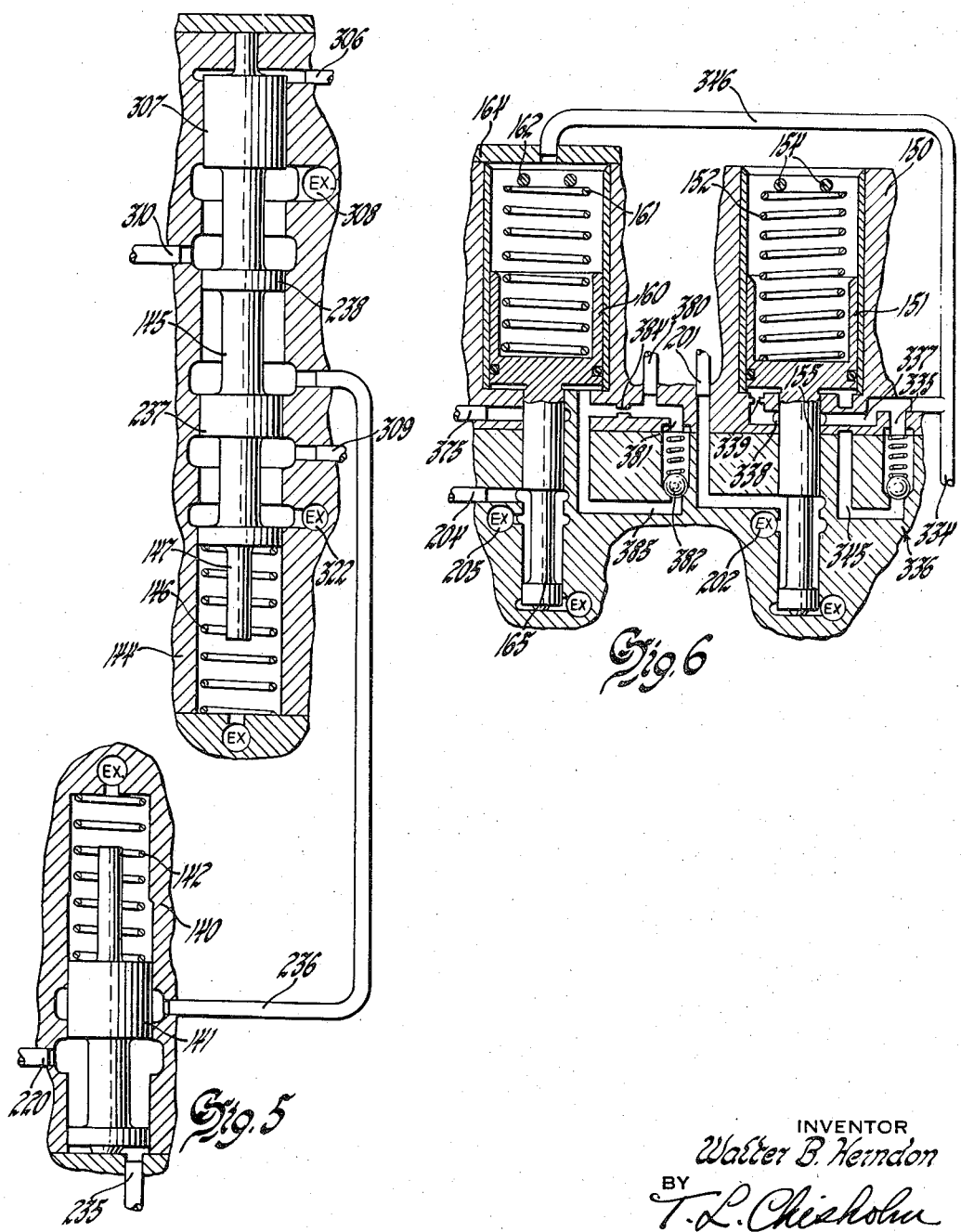

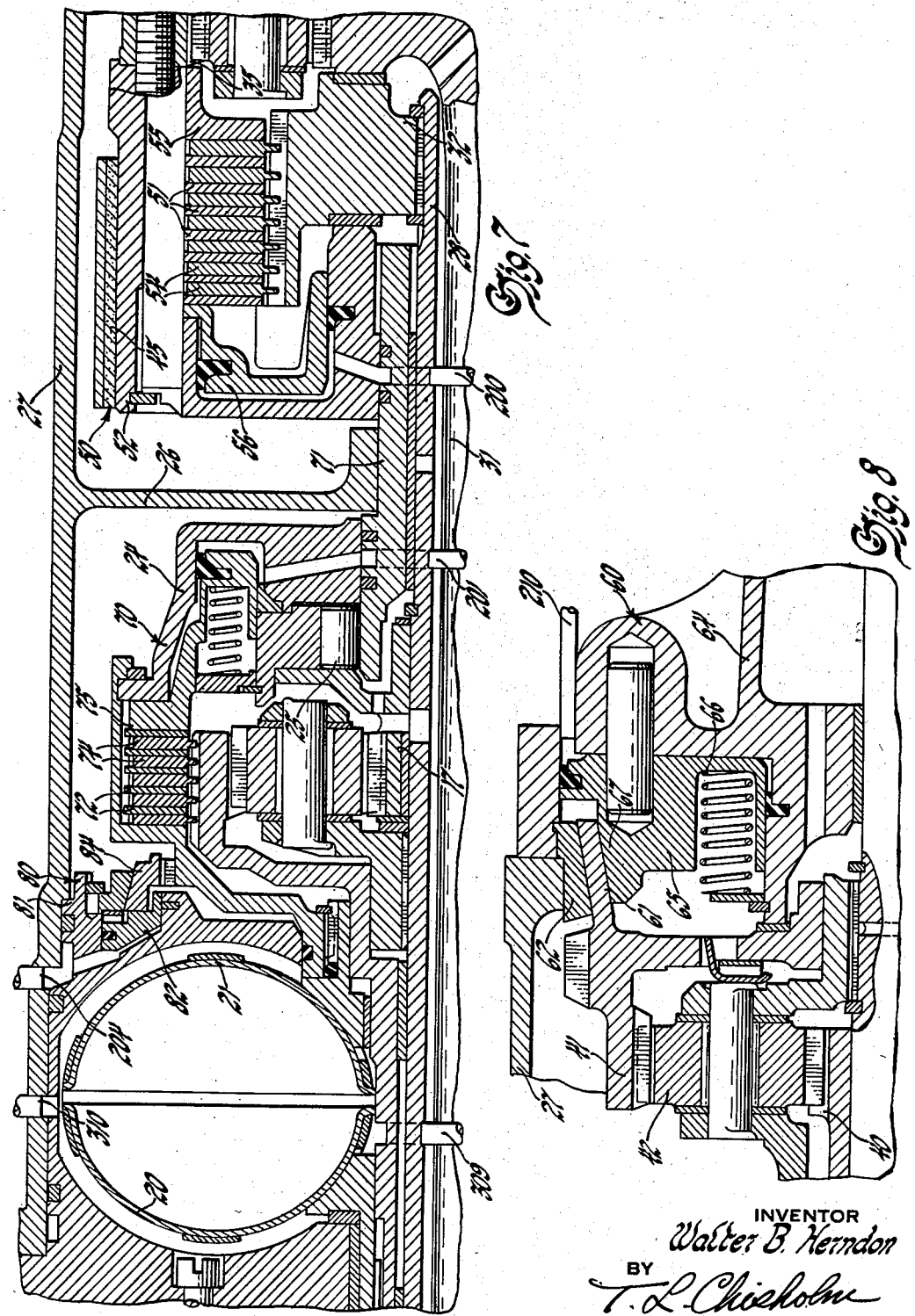

United States Patent Office 2,876,656
Patented Mar. 10, 1959

2,876,656

CONTROLLED COUPLING MULTISTEP AUTOMATIC TRANSMISSIONS

Walter B. Herndon, Rochester, Mich., assignor to General Motors Corporation, Detroit, Mich., a corporation of Delaware Application November 23, 1953, Serial No. 393,698

12 Claims. (Cl. 74—645)

This invention relates to controlled coupling multistep automatic transmissions particularly designed for automotive vehicles.

The invention relates particularly to automatic transmissions employing a series of planetary gear units so related that two of the units are operated in conjunction to provide four forward gear ratios and are operated in conjunction with a third planetary unit to provide one reverse gear ratio. In the operation of planetary units it is customary to procure geared drive therethrough at a ratio other than direct drive by restraining one element of the unit against rotation, thereby to supply the necessary reaction for causing the driven element to be rotated at a different rate of speed from that of the driving element. Direct drive in a planetary unit of this character is usually obtained by so locking two of the elements together as to cause them to rotate in unison and hence to cause all of the elements of the planetary unit likewise so to rotate. Ordinarily, arresting of motion of a reaction element is obtained either through the agency of a one-way brake which permits free rotation of the element in one direction only, or by a brake which can be applied to the element to prevent rotation thereof in either direction. Similarly, direct drive through the unit ordinarily is procured through the agency of a disk clutch hydraulically applied, which causes two of the elements to rotate in unison.

Unless the cooperating mechanisms are calibrated and adjusted with extreme nicety, the change from one gear ratio to another will be readily noticeable by the operator of the vehicle. This is particularly true in installations employing brake bands for arresting rotation of the reaction element of the gear unit.

An object of the present invention is to provide multistep automatic transmissions employing planetary units in series, wherein one unit has one condition of drive therethrough established by a one-way brake to a fixed element, and the other condition of drive established through the agency of a fluid coupling which operates to cause two of the elements to rotate at substantially the same rate.

Another object of the invention is to provide, in a transmission of the type mentioned, a fluid coupling in one of the planetary units for establishing substantially direct drive therethrough, which coupling can have its activation and deactivation so controlled as to cause a change in gear ratio without appreciable shock.

Another object of the invention is to provide a transmission as previously described in which the coupling together of elements in a planetary unit for direct drive therethrough is accomplished by the filling with fluid of a fluid coupling at such a rate as to cause the pump and turbine thereof to approach synchronous rotation at a rate depending on the speed of rotation of the pump, the size of the coupling and the rate of fill thereof.

Another object of the invention is to provide a transmission as previously described in which change of gear ratio in a planetary gear unit from direct drive to geared drive is accomplished by emptying a fluid coupling, which establishes direct drive at such a rate that the member through which reaction is obtained is brought to rest and held at rest without appreciable shock to the mechanism employed.

In carrying out the foregoing and other objects of the invention a transmission embodying this invention is made up of a pair of forward drive planetary units operated in series with a main fluid coupling functionally interposed between the units. A third planetary unit is employed for obtaining reverse drive. The first, or front, planetary gear unit, i. e., that having a drive member driven directly by the engine or other source of motive power makes use of a second or planetary fluid coupling which is filled for obtaining direct drive through the unit and which is emptied when geared drive through the unit is to be obtained. In order that such geared drive may be accomplished, it is necessary that one element of the planetary unit provide the necessary reaction, which in this invention is obtained by the use of a one-way brake which prevents reverse rotation of the reaction element but also permits unrestrained forward rotation thereof. The planetary fluid coupling has its pump connected to be driven with one of the elements of the planetary unit and its turbine to drive another element thereof, in this instance the reaction element, so that when the coupling is operating at maximum efficiency these two elements will rotate substantially in unison, thereby causing the entire unit likewise so to rotate. The second, or rear, planetary unit employed in this transmission has one element thereof capable of being locked against rotation in either direction by a well-known brake band, while the necessary synchronous rotation of two elements thereof for direct drive is obtained through the agency of a hydraulically operated disk clutch. The driven element of this unit is connected to the transmission output shaft. The reverse planetary unit has one element thereof which can be locked against rotation to supply reaction and has the other elements so associated with the output shaft, and with the second unit, that when the three units are properly conditioned reverse rotation of the output shaft can be obtained.

As an auxiliary feature the first planetary unit, having the controlled coupling therein, is provided with a lockup clutch whereby, after a predetermined period of operation of this unit in direct drive for one gear ratio of the entire transmission, the pump and turbine can be locked together through a clutch for eliminating the slippage inherent in fluid couplings.

This transmission is also so arranged as to be capable of being operated in a range of gear ratios, which, for normal driving, consists of the first three gear ratios only, in which event overrun of the reaction member on coasting or the like is prevented in the third gear ratio through the agency of a clutch or brake which locks the reaction member to ground against rotation in either direction. The latter mechanism is so incorporated in the control system for the transmission as to be energized only after third speed has been established for a predetermined length of time.

Other features, objects, and advantages of the invention will become apparent by reference to the following detailed description of the accompanying drawings wherein, Fig. 1 is a schematic illustration of the essential operating parts of the transmission such as fluid couplings, planetary gear units, clutches and the like;

Fig. 2 is a diagram of the hydraulic circuits employed in the operation of the transmission, together with a more detailed showing of various operating parts associated with the planetary units;

Fig. 4 is a similar view of the shift valve body and the various associated valves and plugs therein;

Fig. 5 is a sectional view of two valves employed in the control of filling and emptying of the coupling associated with one of the planetary units;

Fig. 6 is a similar view of the valves utilized for controlling the coupling lockup clutch and the third speed overrun control clutch; and Figs. 7 and 8 are enlarged sectional views of mechanism associated with the planetary units.

Figure 1:
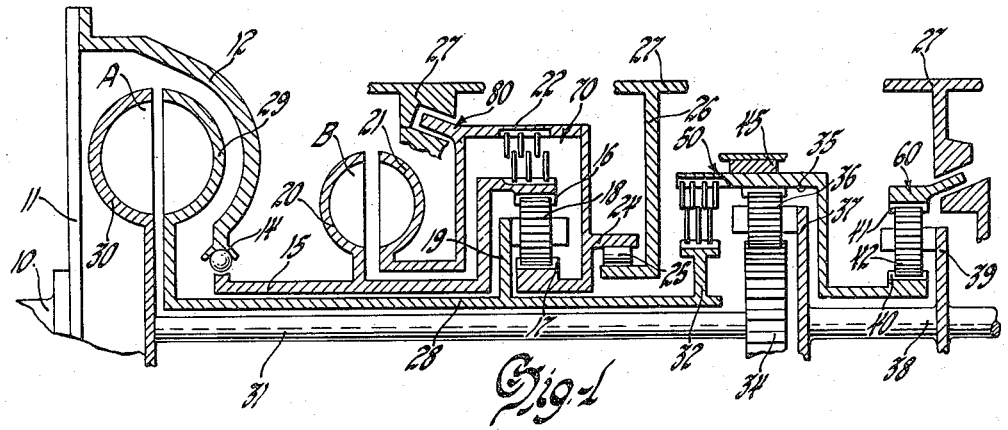

Referring to the drawings and particularly Fig. 1, 10 indicates the output shaft of some prime mover such as an internal combustion engine. Shaft 10 is connected to the usual fly wheel structure 11 which, in turn, is connected to a shell-like member 12 utilized for transmitting torque to the transmission. The shell 12 is connected through a conventional vibration dampening device 14 to an input sleeve shaft 15. Shaft 15 is extended and connected to the driving element or ring gear 16 of the front planetary unit which has as other elements thereof a sun gear 17 and planet pinions 18 rotatable about shafts connected to the planet carrier 19.

Also connected to the input shaft 15 is the pump 20 of a planetary unit fluid coupling B, the turbine 21 of which is connected to the sun gear 17. The connection is made by means of a shell-like member 22 of composite structure, which member has an extension 24 forming part of a one-way brake of the roller or sprag type indicated generally at 25, the ground connection for which is provided by member 26 connected to the casing 27 of the transmission. The planet carrier 19 is connected to a sleeve shaft 28, one end of which is extended to the left, to be connected to the pump 29 of a main fluid coupling A, the turbine 30 of which is connected to an intermediate shaft 31. The other end of the sleeve shaft 28 extending to the right carries a disk-like extension 32 serving as a circuit for parts of a clutch to be described later.

The intermediate shaft 31 extends to the right, terminating in a sun gear 34 of the rear planetary unit, the other elements of which comprise a ring gear 35 and pinions 36 mounted on shafts connected to the planet carrier 37. The carrier 37 is connected directly to the output shaft 38 of the transmission which also has connected thereto the carrier 39 of the reverse planetary unit. This unit is made up of sun gear 40 connected in suitable fashion to the ring gear 35 of the rear unit, the ring gear 41 and planet pinions 42 rotatable about shafts connected to the carrier 39.

Reaction in the rear unit for reduction or geared drive therethrough can be obtained by the brake band 45 which engages the shell to which the ring gear is attached. Direct drive through this unit can be obtained by the clutch indicated generally at 50, such clutch being of the disk type, and is illustrated in more detail in Figs. 2 and 7.

Reaction in the reverse unit can be obtained by the cone clutch or brake indicated generally at 60, secured to the ring gear 41, and which also will be described in greater detail in connection with Figs. 2 and 8.

A coupling lockup clutch indicated generally at 70 may be employed for eliminating the slip inherent in the planetary coupling having pump 20 and turbine 21.

An overrun cone brake indicated generally at 80 can be utilized for obtaining the advantage of engine braking in one speed ratio of the transmission. The details of this device also will be described in connection with Figs. 2 and 7.

The operation of this transmission, which has been schematically illustrated in Fig. 1, is substantially as follows: the drive shaft 10 of the engine or other source of motive power is connected to drive the ring gear 16 of the front planetary unit. Inasmuch as this transmission is designed to provide four forward speeds or gear ratios and a reverse speed or ratio, it is necessary to operate the plenetary units selectively in geared drive (in this instance reduction drive) and direct drive. Consequently, for first speed both the front and rear planetary units are conditioned for reduction drive. For second speed the rear planetary unit remains in reduction drive while the front planetary unit is conditioned for direct drive. In third speed the front planetary unit again is operated for reduction drive while the rear planetary unit is operated in direct drive. For fourth speed both planetary units are operated in direct drive. For reverse operation the first planetary unit is operated in reduction drive, the rear planetary unit is in what may be called an idling condition, while the reverse planetary unit is conditioned for reduction drive with the reaction element so chosen as to cause drive by the front unit in a forward direction, to be translated into reverse drive in the rear planetary unit and also in the reverse unit.

For first speed ratio the band 45 is applied in the rear unit to restrain the ring gear 35 from rotating in either direction, and the clutch 50 is released. In the front unit the coupling B is emptied. In the reverse unit the cone brake 60 is released. The result of such conditioning is that, as drive is transmitted to the sleeve shaft 15, it is communicated to the ring gear 16, the rotation of which, with load on the carrier 19, would normally cause rotation of sun gear 17 in the opposite direction. Such undesired rotation is prevented by the one-way or free-wheel brake 25. Consequently, the carrier 19 is rotated in the same direction as the ring gear 16 but at a reduced speed, driving the sleeve shaft 28 and the pump 29 of the main coupling A. When engine speed advances high enough for the slip in coupling A to be overcome, the turbine 30 thereof is rotated, driving the intermediate shaft 31 and sun gear 34. Since the ring gear 35 is held stationary, rotation of sun gear 34 causes rotation of the pinions 36 about their axes and also rotation of the carrier 37 to which the pinions are attached. The carrier 37 rotates at a reduced speed relative to sun gear 34 and drives the output shaft 38. The reverse unit is in idling condition so that the parts thereof may rotate at will. Thus reduction ratio in both the forward drive units is obtained.

For second speed operation the rear unit remains in its reduction drive condition while the front unit is conditioned for direct drive by filling the coupling B with liquid at a predetermined rate. It will be noted that the pump 20 of the coupling is driven directly by the sleeve shaft 15 and hence rotates at the same speed as the ring gear 16. As the coupling becomes filled, the slip therein is progressively decreased which causes a progressive increase in speed of the turbine 21 and the sun gear 17 connected thereto. This sun gear can rotate in a forward direction since the one-way brake or free wheel 25 permits this action. As the turbine approaches synchronism with the pump, the sun gear likewise approaches synchronous rotation with the ring gear 16 until these two elements of the front unit are rotating at approximately the same rate, the difference being only that occurring inherently in the difference of rotation between the pump and turbine of a fluid coupling. Thus, with the ring and sun gears rotating substantially in unison, it follows that the carrier 19 likewise so rotates so that it may be said that direct drive is achieved in the front unit. The gear reduction therefore in second speed is that afforded by the rear unit.

For third speed operation it is necessary to engage the clutch, indicated generally at 50, associated with the rear unit and to release the brake band 45. In this gear ratio the coupling B is emptied so that the front unit performs exactly as in first speed operation, i. e., at reduction, but the rear unit will be in direct drive within the limits permitted by the slip inherent in coupling A. It will be noted by reference to Fig. 1 that the torque path is divided in third speed, with part thereof being transmitted through the coupling A and part thereof being transmitted through the clutch 50 to the ring gear 35. Consequently, when the turbine 30 of coupling A achieves its minimum slip condition, the sun gear 34 driven thereby will rotate at substantially the same speed as the ring gear 35, with the result that the carrier 37 also rotates with these two elements. The rear unit, therefore, is in substantially direct drive so that, with the coupling B emptied, the gear reduction in the transmission is only that afforded by the front planetary unit.

For fourth speed operation the front unit is again operated in direct drive, i. e., with the coupling B filled, and the rear unit is also operated in direct drive as explained in connection with third gear operation. Thus, within the limits of slip in the two fluid couplings, it will be apparent that the transmission is operating in direct drive.

For reverse drive the cone brake 60 is actuated to lock the ring gear 41 to the casing to prevent rotation thereof. The rear planetary unit is conditioned by having the brake band 45 released and also the clutch 50 released. The front unit is in normal reduction drive condition, with the fluid coupling B exhausted. Under these conditions drive in reduction through the front unit and the main fluid coupling A causes rotation of the sun gear 34 in the forward direction. Since the vehicle load is on the output shaft 38, the planet pinions 36 carried by the carrier 37 afford reaction so that the ring gear 35 is rotated in the direction opposite to the direction of rotation of the sun gear 34. This reverse direction rotation is imparted to the sun gear 40 and, since the ring gear 41 of the reverse unit is held against rotation, it affords a more positive reaction than that of the pinions 42 of the carrier 39 also secured to the output shaft 38. Consequently, the carrier 39 is compelled to rotate in the same direction as the sun gear 40, i. e., reverse direction, carrying the carrier 37 with it which adds to the reverse action established in the rear planetary unit. Consequently, forward reduction drive in the front unit ultimately results in reverse drive in the rear unit and in the reverse unit.

When the vehicle with which the transmission is associated is operated in fourth forward speed for an extended period, it may be desirable to provide an arrangement whereby the slippage in the planetary coupling B can be eliminated. To this end the clutch 70 can be operated after the transmission has been operating in fourth forward speed for a predetermined interval to lock the ring gear 16 to the sun gear 17 so that these parts rotate exactly in unison.

The transmission has its controls so arranged as to provide a second driving range which will be called Drive Range 3 hereinafter, in which normal forward operation of the vehicle is confined to the first three gear ratios. When the transmission is operated with third speed as the highest speed ratio, it will be evident that the fluid coupling B is exhausted, with the result that when an overrun condition occurs, such as by coasting of the vehicle, the benefits of engine braking are lost, since, with increased speed of the carrier 19 relative to the ring gear 16, sun gear 17 can rotate with the carrier die to the one-way brake 25. To obviate this undesirable situation the cone brake 80 is provided. The controls for the transmission are so arranged that when third speed or ratio in Drive Range 3 has continued for a predetermined period, this cone brake will be actuated to lock sun gear 17 to the casing 27 against rotation in either direction. With the sun gear so locked, overrunning tendency of the carrier 19 will be resisted by the ring gear 16 connected directly to the output shaft of the engine, thereby obtaining the braking action of the engine so highly desirable.

Fig. 2 represents a circulation and control diagram and, in association with the hydraulic circuits set forth therein, a more detailed illustration has been made of certain parts shown schematically in Fig. 1. In Fig. 2, however, the main coupling A has been omitted, as well as the connections from the sleeve shaft 15 to the output shaft of the engine.

The clutch arrangement indicated generated at 50 in Fig. 1 is shown in detail in Figs. 2 and 7. The member 32, Fig. 7, is splined to the sleeve shaft 28 and has a flange splined for retaining internally splined clutch plates 54. A composite drum 52, the surface of which is engaged by the brake band 45, has a part thereof internally splined to retain externally splined clutch plates 51. In addition, the drum 52 has a backing plate 55 against which the cooperating plates 51 and 54 can be pressed by piston 56 fitted in a cylinder part of the composite drum. Inasmuch as the composite drum is secured to the ring gear 35 it follows that when the clutch is engaged this ring gear is compelled to rotate with the sleeve shaft 28 and hence at the same speed as the pump 29 of the main coupling A. When the clutch is released and the band 45 applied to the surface of the drum, the ring gear 35 is held against rotation and thereby provides reaction in the rear planetary unit.

The reverse cone brake, indicated generally at 60 in Fig. 1, also is shown in more detail in Figs. 2 and 8. It will be seen in Fig. 8 that the ring gear 41 has an axial extension of outwardly diverging or conical conformation as shown at 61. The casing 27 of the transmission has secured to the inner surface thereof a conical wedge member 62. A fixed cylinder construction 64 has slidable therein a piston 65 pressed normally to the right by spring 66. A surface of the piston 65, indicated at 67, is also wedge shaped or conical to grip the extension 61 between it and the wedge 62. When liquid is admitted to the cylinder 64 to the right of piston 65, this piston is moved to the left and is capable of moving the cone formation of the ring gear until it is locked against motion since the ring gear can move axially a small distance; such movement being permitted by the mating of the teeth of the ring gear with the teeth of the pinions 42 of carrier 39.

Again referring to Figs. 2 and 7, it will be seen in Fig. 7 that the web 26 secured to the casing 27 is fastened to a sleeve 71 which serves as a ground member for the roller one-way brake member 25. Sun gear 17 is secured to the composite assembly 24, a part of which is engaged by the brake member 25, and this composite member is internally splined to retain clutch plates 72. The outer surface of the ring gear 16, Fig. 2, is splined to retain cooperating clutch plates 74, and a piston 75 slidable in the composite member 24 can press these plates together against the left-hand end of the composite member, thereby to lock the sun gear and the ring gear of the forward unit together for direct drive. It will be noted that the turbine 21 of the planetary coupling B is splined to a stepped part of the composite member 24 so that these parts must rotate in unison.

In order that the composite member 24 and hence the sun gear 17 can be locked against rotation in either direction, a wedge member 81 is secured to the casing 27, and a piston 82 is movable to force a cone 84 into contact with the member 81. Member 84 is splined to a step on the exterior of the composite member 24 so that when cone 84 is locked to the wedge 81, composite member 24 and sun gear 17 are locked against rotation in either direction relative to the casing 27.

The hydraulic servo mechanism for applying the band 45 about the surface of drum 52 is of the type well known to the art and of which an example is shown and described in detail in the co-pending application of Kenneth E. Snyder, S. N. 328,725, filed December 30, 1952, for Controls for Servo Mechanisms. Briefly, this servo mechanism, Fig. 2, is of the spring-applied, oil-release type and is composed of a casing 90 so constructed as to provide two chambers within which pistons 91 and 92 can slide. Piston 91 has secured thereto a plunger 94 movable to engage a linkage, indicated generally at 95, whereby movement to the left of the plunger wraps the band 45 about the drum to hold it against rotation. It will be noted that springs are located within the casing 90 to force the two pistons 91 and 92 to the left to apply the band and, further, it will be seen that oil supply lines communicate with the two chambers so that the pistons can be moved to the right under hydraulic pressure and, in addition, oil can be supplied to the interior of the skirt of piston 91 to continue through hollow stem 96 into the interior of the skirt of piston 92. Oil for this purpose is termed compensator pressure and its application will be mentioned in the full description of the operation of this device.

Referring to Figs. 2, and 3 to 8, the control mechanism for this mechanism has been shown. A manual valve body 100, Fig. 3, has a bore in which is slidable a manual valve 101 which has three lands, 102, 104 and 105. The outer end is provided with spaced flanges 106, between which fits an actuating member 107, connected by suitable linkage to a position convenient to the operator of the vehicle. The manual valve has five positions which have been indicated in Fig. 3 as "N" for Neutral, "DR–4" for Drive Range 4, "DR–3" for Drive Range 3, "LO" for Low, and "R" for Reverse. Communicating with the bore of the manual valve are a number of ports having oil conduits connected thereto which will be described in the general description of the operation of the mechanism. This manual valve body also has a bore in which is slidably mounted a throttle valve structure of valve parts 110 and 111 which have interposed therebetween a spring 112. In alignment with the bore of the throttle valve is an enlarged bore for the reception of detent plug 114. Also in the manual valve body is a stepped bore acting as a slideway for stepped double transition valve 115. Adjacent the end of this latter bore is a still further bore in which is slidably mounted a compensator valve 116, pressed to the left by spring 117. Various fluid passages and conduits are associated with these valves, and the fluid circuit employed in association will be apparent from later description.

Referring again to Figs. 2 and 4, the control apparatus includes a shift valve body having a plurality of bores therein in which are mounted a plurality of valves and associated plugs. These valves Fig. 4, comprise the 1st to 2nd shift valve 120, 1st to 2nd governor plug 121, 1st to 2nd regulator plug 122, 2nd to 3rd shift valve 124, 2nd to 3rd auxiliary valve 125, 2nd to 3rd governor plug 126, 3rd to 2nd detent plug 127, 3rd to 4th shift valve 128, 3rd to 4th governor plug 129, 3rd to 4th lockout valve 130, 3rd to 4th regulator plug 131 and throttle valve regulator plug 132. Ordinarily the shift valve body and the manual valve body will be superposed, one on the other, and various fluid passages in the respective bodies will be in register. However, in order that the action may be understood more clearly, these intercommunicating passages have been omitted and passages have been shown in such fashion that fluid paths can be readily traced.

Referring to Figs. 2 and 5, it will be seen that two valves are provided for controlling the filling and emptying of the planetary coupling B. Valve body 140, Fig. 5, has a bore therein for the reception of the limit valve 141. Valve 141 is normally pressed downwardly by spring 142. Body 144 has coupling valve 145 therein, normally pressed upwardly by spring 146 and having a stem 147 which limits downward movement.

Again referring to Fig. 2 and also Fig. 6, body 150 has a bore therein for piston 151, pressed downwardly by spring 152, which has its top end restrained by crosspins 154. The piston 151 has a valve stem 155 slidable in a bore in the body 150 of smaller diameter than that receiving the piston. Body 150 also has a bore therein for the reception of slidable piston 160 pressed downwardly by spring 161, the top end of which is restrained by crosspins 162. The top of this part of the bore is partially closed by the cover 164. Piston 160 also has a valve stem 165 slidable in a part of the bore of smaller diameter than that in which the piston slides.

These valves, as well as others previously mentioned briefly, have ports and conduits leading thereto for the supply of oil during certain phases of operation of the system. The piston 151 and stem 155 are designed to function in collaboration with the coupling lockup clutch 70, while the piston 160 and stem 165 function to control the operation of the overrun brake 80.

Other parts of the mechanism which have not been mentioned specifically, and greater details concerning those which have been described briefly, will become apparent as the cycles of operation of the transmission are followed. This operation will be described in connection with the various driving ranges and with the various possibilities occurring in each range.

*Neutral*

As is common with many mechanisms of this type, provision (not shown) is made for preventing starting the engine until the manual valve 101 has been placed by the operator in the Neutral position. When so properly positioned, the engine can be started, which immediately causes rotation of the output shaft 10, and by it rotation of the sleeve shaft 15 and the ring gear 16 as well as the pump 20 of the planetary coupling B. Since it is desired that there be no transmission of torque in Neutral position, it is imperative that the coupling B be inoperative, that the coupling lockup clutch 70 be released, that the clutch 50 for the rear unit be released, the band 45 for this unit also be released, and that the rear planetary unit cone brake 60 be released.

As soon as the engine rotates its output shaft 10, flywheel 11, shell 12, and sleeve shaft 15, the front pump indicated at 170, Fig. 2 (and driven by sleeve shaft 15), draws oil from the sump of the transmission (not shown) through the line 171 and delivers the same to various parts of the mechanism. Pump 170 is of the variable capacity type, and particularly is of the type shown in the application of W. B. Herndon, S. N. 140,176, filed January 24, 1950, for Variable Capacity Pressure System. It is believed sufficient to point out merely that the output of the pump can be varied in accordance with pressure supplied to control valving therein. As soon as the pump becomes operative it delivers oil under pressure through the main pump line 175 to the check valve structure 176, moving the ball 177 into its conical seat 178 to prevent oil continuing to the rear pump, which will be described later. From the valve body 176 the oil continues through line 179 to the bottom of the exhaust valve body 180 having a bore in which spring opposed valve 181 can be forced upwardly. This valve 181 normally is seated at the bottom of the bore, but can be raised high enough to clear line 182 which extends to a port in the manual valve body. The port communicating with the line 182 in the valve body has a branch 183 for a purpose to be described later. With the manual valve 101 in Neutral position, the land 105 will be positioned at the right of the port connected to line 182, while the land 104 will be moved to the left sufficiently to uncover a port connected to line 185, placing this line in communication with the pump line 182 via the bore of the manual valve. Line 185 extends past the double transition valve 115 with a branch 186 communicating with this valve, past the shift valve body with a branch 187 extending thereinto, to the servo for the rear band with branches 188 and 189. The line 185 leads directly into one chamber of the servo to move piston 91 to the right, while the branch 189 extends into the other chamber of the servo to move piston 92 to the right. Passage of oil into this second chamber is under the control of reed valve 190 which has a restricted orifice therein and which can move about its attachment point to permit ready flow into the chamber, but which will return to its seat, as shown, to retard exit of oil from the chamber. The branch 188 extends to the housing 191 in which valve 192 is spring-pressed to the left, severing communication between the branch 188 and the chamber having piston 92 therein. The purpose of this exhaust valve will be described in connection with operation in Low range. The supply of oil to move the two pistons 91 and 92 to the right opposes spring action, which normally keeps the band 45 applied, so that this band is released in Neutral position.

The cylinder for piston 56 of the rear unit clutch 50 is exhausted through line 200 which extends to a port in the manual valve and, since the land 102 of the manual valve in Neutral position extends beyond the left end of the casing 100, the end of the bore to the left of the port connected to line 200 is open to the sump. The cylinder for piston 75 of the coupling lockup clutch 70 is exhausted through line 201 which extends to a port in the bore for the valve stem 155 and, since that valve is in its downmost position, the bore connected to line 201 is in communication with exhaust in the port 202. The cylinder for piston 82 of the overrun brake 80 is exhausted by line 204 which extends to a port in the bore for the valve stem 165 which also is in its downmost position, opening this port to communication to exhaust at the port 205. The cylinder for piston 67 of the reverse brake 60 is exhausted through line 210 which extends to the manual valve body and is connected to a port therein, which in Neutral position has an unobstructed passage for oil to the right end of the manual valve which is open to the sump.

From the foregoing description of the actuating mechanism associated with the planetary units, it will be seen that the only reaction established in any part thereof is that afforded by the one-way brake 25 of the front unit so that the elements of the rear planetary unit and the reverse planetary units are in condition to rotate freely without transmitting torque.

Oil under pump pressure also extends through a line 215 connected to the bottom of the exhaust valve casing 180 to the parking piston 216 which is moved to hold the parking pawl 217 in released position, thereby conditioning the transmission for drive at a later point in the cycle of operation. A branch line 219 from line 215 extends to the governor indicated generally at 218, but since this governor is driven by the output shaft of the transmission, it is stationary in Neutral position.

Branch line 220 from pump supply line 175 extends to a port in the body 140 to enter the bore thereof below the main land of limit valve 141. Since this valve is normally in its downmost position under the urge of spring 142, further travel of the oil is arrested in Neutral. Oil is also supplied directly by the pump 170 through the line 221 to the main fluid coupling A (not shown in Fig. 2) to fill the same, the oil discharged from the coupling serving for lubrication purposes throughout the transmission mechanism. Inasmuch as various oil channels for such purposes are well known, detailed illustration thereof has been omitted.

*Drive range four—Idling*

When the manual valve is moved to the Drive Range 4 position, the land 104 thereof interrupts communication between the supply line 182 and its branch 184 and the line 185 which extends to the rear servo to cause release of the band, as previously described. At the same time the land 102 of the manual valve has moved to a position within the bore thereof, blocking exhaust at the left end of this bore. As soon as this position of the manual valve has been achieved, the rear servo is exhausted of release oil pressure since the oil can be discharged from the servo under spring pressure by passing through the line 185 to the bore of the manual valve and therefrom through line 200 to branch line 225 which extends to a port in body 226 for the 3rd to 2nd timing valve 227. From this bore line 228 extends to the bore of the 2nd to 3rd shift valve 124 which, in the normal position of this valve, is open to exhaust at the port 229. It will be noted that a restricted bypass 230 is connected between the lines 225 and 228 so that some of the oil being exhausted can pass therethrough but, since the passage previously described is unobstructed, the major part will follow that course, so long as the valve 227 is in the position shown, such position being maintained under most conditions by the spring 231. Release of oil from the rear servo in the manner just described permits the springs of the servo to force plunger 94 to the left, causing the band 45 to be applied to the drum 52 of the rear planetary unit, locking the ring gear 35 against rotation and thereby conditioning this rear unit for reduction drive therethrough. However, no drive will be accomplished so long as the engine is at idling speed, due to the slip occurring in the main coupling A.

With the manual valve in the position last described, oil under pump pressure supplied to the bore thereof by line 182 can continue therefrom through the line 235 to a port in the bottom of the bore of body 140 to lift limit valve 141 upwardly, thereby placing the line 220 in communication with line 236 which extends to a port in the body 144 and into the bore thereof between two lands 237 and 238 of coupling control valve 145. Further progress is arrested at this point. Line 235 also delivers oil to the branch 239 which extends with a restricted passage 240 to a port connected to the bore of the 2nd to 3rd shift valve 124, at which point further progress is arrested. It will be noted that the rear clutch 50 is exhausted through part of line 200, the branch line 225 and other lines connected in series therewith in the same manner as exhaust of the rear servo is accomplished. The transmission will remain in condition ready to transmit torque, but such transfer does not occur so long as the engine speed is restricted to that favorable for idling.

*First speed*

As soon as the accelerator of the vehicle is moved to supply more fuel to the engine, thereby to increase its speed, the speed of rotation of the pump 29 of main coupling A will be increased sufficiently to cause drive of the turbine 30 thereof through the agency of the front planetary unit in which reaction is furnished by the sun gear 17, free wheel braked by 25. Drive in this front unit, as before mentioned, is through the ring gear 16, with the output being provided by the carrier 19 connected to the pump 29 of coupling A. While the pump 20 of planetary coupling B is driven concurrently with the ring gear 16, this coupling is empty in first speed, and hence it may be said to be in a deactivated condition. Rotation of the turbine 30 of coupling A drives the sun gear 34 of the rear unit and, since ring gear 35 is braked against rotation by band 45, the pinions 36 and the carrier 37 cause rotation of the output shaft 38 at a reduction ratio which is the combination of that obtained in the front and rear units. The output shaft 38 may constitute or be connected to the propeller shaft of the vehicle to impart drive thereto.

Figure 3:
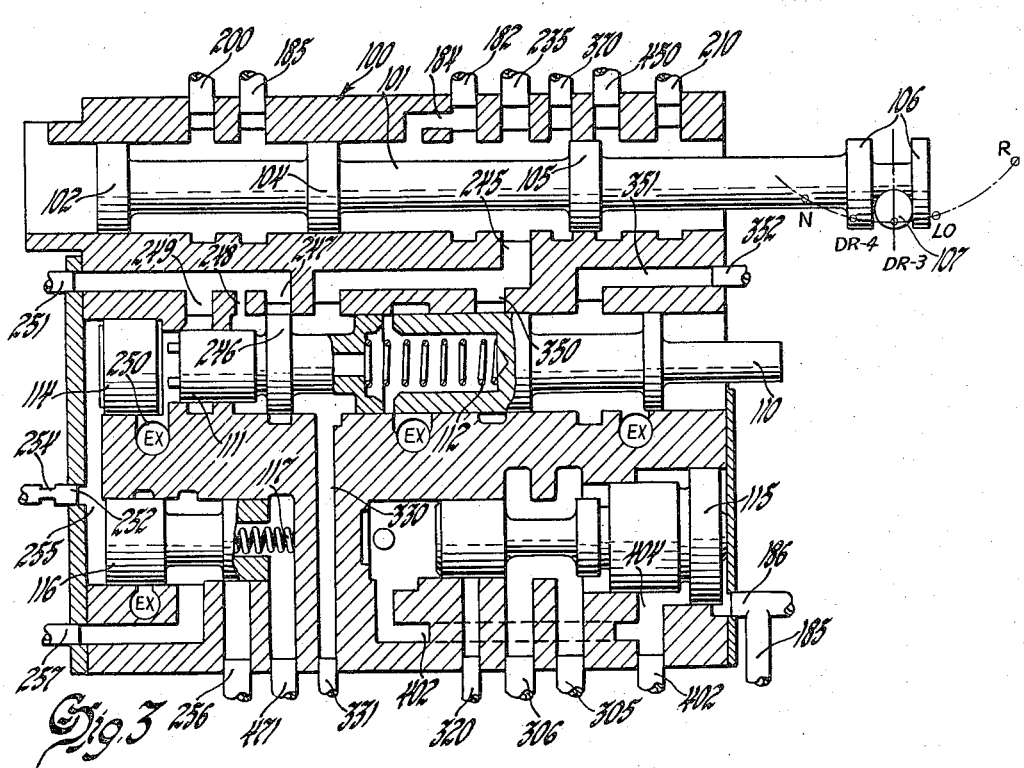
Fig. 3 is an enlarged sectional view of the manual valve body which also accommodates other valves, the functions of which will be described later.

With the transmission in operation transmitting torque, additional factors are introduced. As the throttle is advanced, a connection therefrom, not shown, moves the throttle valve 110 to the left and, through the spring 112, causes movement of the part of the valve member 111. Referring particularly to Fig. 3, it will be seen that the bore of the manual valve 101 has connected thereto a passage 245 extending to the bore for the valve 111. As this valve is moved to the left, land 246 thereof uncovers passage 247, permitting oil to enter this passage and continue therefrom to various parts of the mechanism. A bypass 248 connects passage 247 with the left end of land 246 so that, as the pressure is built up in the parts supplied by the passage 247, this pressure reacts on land 246, moving it and valve 111 to the right against spring 112 sufficiently to cause the left end thereof to open passage 249 connected to exhaust at 250. The valve 111 therefore acts as a metering valve to cause the development of what is called throttle valve pressure in proportion to the advancement of the engine throttle.

Oil leaving the passage 247 by line 251 continues directly to the regulator mechanism of pump 170 to vary the capacity of the pump and hence the pressure developed thereby in accordance with throttle position. A branch line 252 extends through a restriction 254 to an internal passage 255 in the manual valve body 100 to act on the detent plug 114 and the compensator valve 116, moving each of these members to the right. The purpose of the detent plug 114 will be described later. Movement of the compensator valve 116 to the right against spring 117 a distance depending on the pressure of the oil acting on the left end of valve 116 opens the bore thereof to a port connected to line 256 which is connected to the pump pressure supply line 182. Oil entering the bore of the compensator valve from line 256 can continue therefrom through line 257 to the front chamber of the rear servo and into the skirt of piston 91 to aid spring pressure, moving this piston to the left. As before mentioned, the stem 96 is hollow so that this oil can pass therethrough into the skirt of piston 92 to aid spring pressure in moving it also to the left. Oil thus supplied, which is known as compensator pressure oil, is utilized for increasing the force exerted in wrapping band 45 about the drum 52 so that, as the force transmitted by the transmission increases, the necessary increase in reaction sustaining effort by the band is also increased. Compensator pressure therefore varies in accordance with throttle position.

Oil under throttle valve pressure also continues by line 258 from line 251 to the bore of the throttle valve regulator plug 132 (in the shift valve body) which is spring pressed to the right. The oil so supplied to this plug moves it to the left, uncovering passage 259 which extends to the upper end of ball check valve 260. A branch 261 from passage 259 extends to the bore of the plug so that in certain positions of the valve the passage 259 is connected to exhaust at the end of this bore. Movement of plug 132 to the left also uncovers passage 262 which has a branch 264 communicating with the left end of the large land of plug 132. Passage 262 continues to the bore of the 3rd to 2nd detent plug 127, from which it may continue by passage 265 to the left end of the 2nd to 3rd shift valve 124 to aid the spring associated therewith in holding this valve in the position shown in Fig. 4. The passage 262 is continued to the bore of the 1st to 2nd regulator plug 122 to act on the left end of the large land thereof, moving this plug to the right and uncovering a passage 266 which communicates with the left end of the 1st to 2nd shift valve 120 to aid the spring associated therewith in holding this valve in the Fig. 4 position. Passage 262 continues to the bore of the 3rd to 4th regulator plug 131, moving it to the right to uncover passage 267 communicating with the left end of the 3rd to 4th lockout valve 130, moving it to the right to compress spring 268 to assist in holding the 3rd to 4th shift valve 128 in the Fig. 4 position. The plug 132 acts as a regulator valve, modulating the throttle valve pressure supplied by line 258 in accordance with the resistance afforded by various parts supplied with oil by the line 262 and, in fact, the plug 132 may be called a metering valve.

Rotation of the output shaft 38 causes activation of the governor 218. This governor, which is supplied with oil under pump pressure through line 219, is in actuality a pair of metering valves influenced by centrifugal force, with one valve having a heavier weight than the other so that, as these valves revolve, they meter the delivered pressure in accordance with centrifugal force acting on the weights and varying with the speed of revolution of the valve as influenced by the delivered pressure. Governors of this type have been shown and described in detail in Thompson Patent No. 2,204,872, issued June 18, 1940, for Change Speed Gearing and Control. The metering valve having the heavier weight develops output pressure faster than that having the lighter weight and, for purposes of brevity, these pressures will be identified hereinafter as G–1 pressure (for the valve having the heavier weight) and G–2 pressure (for the valve having the lighter weight).

G–1 pressure is delivered by line 270 directly to piston 271 which serves to actuate reverse blocker mechanism indicated generally at 272. When G–1 pressure reaches a value corresponding to a vehicle speed of approximately eight miles per hour, this pressure is high enough to prevent the manual valve from being moved to the reverse position, which could injure the mechanism. A branch line 274 from line 270 extends to the right end of a land on the 3rd to 4th shift valve 128. Another branch line 275 from line 270 extends through the wall of the shift valve body to act on the right end of the 1st to 2nd governor plug 121. Branch 276 extends into the valve body and is continued to supply the right surface of the large land of 1st to 2nd shift valve 120. A still further branch 277 extends through the end of the valve body to supply oil to the right end of the 2nd to 3rd governor plug 126.

Oil under G–2 pressure is discharged by the governor through line 280 which extends to the right end of the 2nd to 3rd auxiliary valve 125. A branch line 281 from line 80 extends to the right end of the 3rd to 4th governor plug 129.

The rear pump 290, which may be of any well-known type, is also driven by the output shaft 38. This pump draws oil from the sump through line 291 and delivers it through line 292 to the check valve body 176, at which point the pressure developed by the rear pump will unseat ball 177 so that the system can be supplied with oil from the rear pump when sufficient vehicle speed is developed. It will be seen that the oil delivered by the rear pump can extend to the front pump 170 so that this pump may, under certain conditions, be incapacitated, with the result that the rear pump serves all of the hydraulic apparatus.

The transmission will continue to operate in first speed or gear ratio so long as the output shaft speed is such that the governor pressure G–1 delivered by governor 218 is insufficient to cause shift of the 1st to 2nd shift valve. It will be understood that governor pressure, as utilized for progressive upshift of the transmission, is opposed both by spring pressure and by modulated throttle valve pressure. Consequently, with advanced throttle and increased modulated throttle valve pressure, higher governor pressures are required to shift the transmission so that the shift points for each speed ratio may vary over a fairly wide range of vehicle speed.

*Shift first to second*

When G–1 pressure, developed by governor 218 and delivered through branch 275 to the 1st to 2nd governor plug 121 and through branch 276 to the 1st to 2nd shift valve 120, is high enough to overcome spring resistance and modulated throttle valve pressure, the 1st to 2nd shift valve 120 will be moved along with plug 121 to the left, cutting off passage 300 connected to exhaust at port 229 and connecting line 301 fed through a restriction 302 from the pump supply line 182 to a passage 304 which extends through the valve body to a conduit 305. Conduit 305 extends to a port connected to the bore of the double transition valve 115, which at this time is in the position shown in Fig. 3. From the bore of this double transition valve the oil continues to a port connected to line 306 which extends to the top of the coupling control valve body 144. Oil so delivered acts to force valve 145 downwardly against spring 146, causing land 307 to close the exhaust port 308 and causing land 237 to place the port connected to line 236 in communication with a port connected to line 309. Line 309 extends to the fluid coupling B and is used to fill this coupling with oil. An exhaust line 310 from the coupling extends back to the body 144, at which point escape of the oil is arrested by the new position of land 307 of valve 145. Filling of the coupling B causes the pump 20 thereof, which has been rotating in unison with ring gear 16, to impart rotary motion to the turbine 21 of the coupling which is connected to the sun gear 17. As the coupling is filled and drive of the turbine is initiated and progressively accelerated, the sun gear 17 is driven at the same rate as the turbine 21 so that it assumes rotary motion permitted by the one-way brake 25 and, depending on the rate of fill of the coupling, attains substantially the same speed of rotation as the ring gear 16. Thus within a predetermined short interval of time the sun gear will rotate at substantially the same speed as the ring gear (within the limits depending upon the inherent slip in coupling B) so that eventually these two elements of the front planetary unit rotate at such closely corresponding speeds that, for all practical purposes, it may be said that the front unit is operating in direct drive.

The rear unit remains in its established reduction drive condition so that, in second speed with the front unit in substantially direct drive, the transmission has an overall reduction ratio afforded solely by that of the rear unit.

The limit valve 141, which controls the supply of oil from the pump 170 to the coupling control valve 145, operates to prevent filling of the coupling from reducing the available pump pressure at other parts of the transmission. For example, assuming that pump pressure is 95 lbs. per square inch under normal conditions and that a minimum of 85 lbs. per square inch is required for the operation of various parts in the transmission, it will be apparent that if a relatively large volume of oil is suddenly introduced into the planetary coupling B the available pressure may drop below the satisfactory minimum. The valve 141 is sensitive to available pressure and is calibrated to assure that such pressure is maintained while the coupling is being filled. For this purpose spring 142 may be calibrated to exert a force of 85 lbs. per square inch on the upper end of valve 141, which force is opposed by available pump pressure fed through the line 235 from the bore of the manual valve. Consequently, should the volume of oil being fed to the coupling B through line 309 from the control valve 145 reduce the available pressure in the system below the satisfactory minimum, i. e., 85 lbs. per square inch, which acts on the lower end of valve 141, the spring 142 will immediately force this valve downwardly, cutting off supply of oil to line 236 and hence to coupling B and maintaining that condition until pump pressure rises above the satisfactory minimum. Such operation may retard the filling of the coupling but, inasmuch as the time element involved is very short, no undesired results will ensue and, on the contrary, release of other parts of the mechanism, due to low oil pressure, will not occur.

*Shift second to third*

When G–1 pressure from governor 218 applied to the 2nd to 3rd governor plug 126 and G–2 pressure supplied by line 280 to the 2nd to 3rd auxiliary valve 125 are sufficiently high to overcome the resistance of the spring acting on the 2nd to 3rd shift valve 124 in conjunction with modulated throttle valve pressure, the two members 125 and 126 will move to the left, forcing the 2nd to 3rd shift valve also to the left. Such movement of the shift valve isolates the exhaust port 229 and connects the pump pressure supply line 239 connected to line 235 extending from the manual valve, to the line 228 which introduces oil into the bore of valve 227 to pass therethrough into the line 225 and thence to line 200. Of course some of the oil will pass through the restriction 230. Oil entering the line 200 can continue to the cylinder of piston 56 to the rear clutch 50 and also can continue into the bore of the manual valve and thence through line 185 to the rear servo in the manner explained in connection with Neutral. Pressure will not be developed behind piston 56 sufficient to fully engage the clutch 50 until a suitable pressure has been developed in both chambers of the servo sufficient to cause this servo to retract the plunger 94, thereby to release the band 45. As this pressure is developed in the rear servo, the rear clutch 50 is engaged by the final movement of piston 56 so that as the band 45 is released the clutch 50 is engaged. In this manner loss of torque or engine runaway is prevented. At the same time oil in line 185 passes through branch 186 to the right end of double transition valve 115, moving it to the left and sealing the port connected to line 305. This latter move disrupts the supply of oil to the top of valve 145, and in fact the oil previously supplied thereto through line 306 from the bore of the double transition valve can now exhaust through line 306, bore of the double transition valve and line 320 which extends to a port connected to the bore of the 3rd to 4th shift valve 128, and from that bore to exhaust at the port 321. When oil is exhausted from the top of valve 145, this valve is moved upwardly by the spring 146, causing the land 237 to interrupt the supply of oil to the line 309 which extends to the coupling B and placing that line in communication with exhaust at the port 322. This upward movement of valve 145 also places the line 310 extending to the coupling B in communication with exhaust at port 308 in the body 144 so that the oil in the coupling has two avenues of exhaust therefrom. As this oil is exhausted the torque transmitted by the pump 20 to the turbine is reduced over a sliding scale with the result that the turbine and the sun gear 17 slow down as the planetary gear set seeks to establish reaction in the sun gear. The result is that this gear progressively decelerates until it comes to rest, and normally would be driven backwardly except that the one-way brake 25 prevents such reverse rotation. In this fashion a very smooth transition from direct drive to geared or reduction drive is accomplished in the front unit. It will be understood that the engagement of clutch 50 in the rear unit and concurrent release of the band 45 associated therewith cause a change from geared or reduction drive in the rear unit to direct drive therein. Such direct drive is due to the ring gear 35 being driven by the sleeve shaft 28 which also drives the pump 29 of the main coupling. Consequently, since the sun gear 34 of the rear unit is driven by the turbine 30 of coupling A, it follows that the ring gear and sun gear will be driven at substantially the same speed within the limits imposed by the inherent slip of coupling A. For all practical purposes the speeds of rotation of these two elements are so nearly alike that the planet pinions 36 rotate in unison therewith, carrying the carrier 37 at the same speed.

Some of the oil directed toward the servo for the rear unit is diverted through branch line 187 to the right end of the 1st to 2nd shift valve 120 to insure this valve remaining open so long as the 2nd to 3rd shift valve is open.

In third speed, with the front unit in reduction drive and the rear unit in direct drive, the overall ratio of the transmission is solely that afforded by the reduction in the front unit.

*Shift third to fourth*

The vehicle will continue operating in third gear until the governor attains a speed sufficiently high to develop G–1 and G–2 pressures which are conveyed respectively through the branch 274 to the 3rd to 4th shift valve and through branch 281 to the 3rd to 4th governor plug to move the valve and the plug to the left against spring resistance and modulated throttle valve pressure. When this change of shift valve position occurs, oil under pump pressure supplied to the bore of manual valve 101 by the line 235 and continuing therefrom through the channel 245 to the bore of the throttle valve portion 111, continues through channel 330 to a port connected to line 331 which extends to a port connected to the bore of the 3rd to 4th shift valve 128, from which it can continue through line 320 to the bore of the double transition valve and thence through line 306 to the top of valve 145, moving it downwardly and permitting filling of coupling B in the manner described in connection with second gear operation. This establishes the front unit again in direct drive, with the result that the overall ratio of the transmission is substantially 1:1, which is the optimum condition.

Should it be desired to eliminate completely the slip of coupling B, such objective can be attained by engagement of the coupling lockup clutch 70. Referring again to Fig. 2, it will be seen that a branch line 334 extends from line 320 near the double transition valve to a port in the body 150 for the lockup clutch control valve. Within this body two channels are provided. One channel 335 extends to the top of a ball check valve indicated generally at 336, while the other channel 337 extends to an annular port 338 in the bore accommodating valve stem 155. Oil can continue from this annular port through a restricted passage 339 into the bore containing piston 151, causing this piston to move upwardly at a rate depending on the size of the restriction 339. When the piston and the valve stem 155 have been moved upwardly sufficiently for the stem to clear the annular port 338, oil supplied by the branch channel 337 may then proceed through line 201 to the cylinder of the piston 75 of lockup clutch 70, causing this piston to compress the plates 72 and 74 to lock the sun gear 17 to the ring gear 16 for rotation in unison. The rate of fill of the bore for piston 151 is determined to assure the coupling B having attained full torque transmitting operation before this clutch is engaged.

It will be noted by referring to Fig. 6 that the valve body 150 has an interior channel 345 extending from the lower end of the cylinder having piston 151 to the lower end of the ball check valve 336. The purpose of this arrangement is to permit the oil which had elevated piston 151 at a retarded rate to be exhausted therefrom when required by being forced through the channel 345 to lift the ball of check valve 336 and permit unhampered exhaust. Conditions requiring such action will be described later.

At the same time that oil is supplied to the valve body 150 by the line 334, it is also supplied by the branch line 346 to the top of the cylinder containing piston 160. The oil entering this cylinder aids spring 161 to hold piston 160 and stem 165 thereof in downmost position for the purpose of preventing adventitious engagement of the overrun clutch 80.

While the coupling lockup clutch and its control have been described in conjunction with this transmission, it will be apparent to those skilled in the art that such a clutch can readily be omitted if the torque transmission characteristics of the coupling are sufficient to cause minimum slip therein which will not ordinarily be high enough to interfere with direct drive in the transmission.

Operation of the transmission in fourth speed will continue so long as governor pressure is sufficiently high to overcome modulated throttle valve pressure acting solely on the 3rd to 4th governor plug 131. Since this plug was forced to the left when the 3rd to 4th shift was made, it follows that passage 267 was closed so that modulated throttle valve pressure no longer acts on the 3rd to 4th lockout valve 130 which, having a large area, necessitated high governor pressure to cause the final shift. Thus shift from 4th to 3rd as governor pressure falls will occur at a considerably lower vehicle speed than that at which the upshift occurred.

The same condition prevails in connection with the other shift valves and their trains of associated plugs, and the like, as will be readily apparent by reference to Fig. 4. As the vehicle speed decreases, progressive shifts from one gear ratio to the next lower ratio will take place at certain relatively low vehicle speeds.

Fourth to third forced downshift

Should it be desired to increase the acceleration of the vehicle when proceeding at a speed below a certain maximum, such added acceleration can be obtained by what is known to the art as "kickdown" or "detent downshift." To accomplish this the operator of the vehicle moves the accelerator pedal or other control to and beyond full throttle opening. Referring to Fig. 3, it may be said that full throttle opening occurs when the parts 110 and 111 of the throttle valve are brought together and the end projections on the part 111 are in contact with the detent plug 114 moved to the right by throttle valve pressure. Further movement of the throttle control mechanism will be against the resistance created in this plug and will be perceptible to the operator. When the throttle valve train has been moved to its ultimate left position, a branch 350 from passage 245 is opened by the valve 110, permitting oil in this branch 350 to enter the bore of the throttle valve and pass therefrom through channel 351 connected to the line 352. This line 352 continues to a port connected to the bore of the 3rd to 4th regulator plug 131 which in fourth speed operation is in the position shown in Fig. 4. From the bore of this plug the oil may pass into the interior of the 3rd to 4th lockout valve 130, moving it to the right and forcing the 3rd to 4th shift valve 128 also to the right. Movement of the 3rd to 4th shift valve 128 to the right closes the port connected to line 331, thereby arresting supply of oil to the line 320 and connecting that line to exhaust at the port 321. Consequently, the oil supplied to the top of valve 145 through the line 306 from the double transition valve is exhausted through the line 320, as just explained, and simultaneously oil supplied to the coupling lockup valve body 150 is also connected to exhaust in the same fashion through line 320. When this exhaust condition is established, oil in the cylinder of piston 151 is permitted to exhaust rapidly under the urge of spring 152 through the channel 345 and past the ball of the ball check valve 336. Thus a rapid emptying of this cylinder is accomplished which permits the piston 151 and valve stem 155 to quickly resume the Fig. 6 position, connecting the line 201 to exhaust at port 202 (Fig. 6). When oil is exhausted from the top of piston 145 through the line 306, etc., the piston 145 is moved upwardly to exhaust the coupling B in the manner described in connection with 2nd to 3rd shift. This reestablishes reduction drive in the front unit while direct drive is maintained in the rear unit and permits the car to be accelerated at a faster rate than would be possible in fourth speed under certain operating conditions. So long as the throttle is maintained in the detent position the transmission will continue to function in third gear ratio until a high vehicle speed resulting from excessive engine speed is attained.

At this time governor pressure applied to the 3rd to 4th governor plug 129 and to the 3rd to 4th shift valve 128 will be high enough, when acting on areas different from that subject to throttle pressure (which is full pump pressure), to cause a 3rd to 4th shift. It will be understood, of course, that the springs and various areas are calibrated to cause this overcontrol so that excessive engine speed will be prevented.

Manual fourth to third downshift

Assuming that the transmission is operating in fourth speed and it is desired to obtain the benefits of engine braking, which can be obtained by operation in third speed, or to obtain added acceleration, such can be accomplished by moving the manual control valve to the Drive Range 3 position. When this occurs, oil supplied to the bore of the manual valve can now depart therefrom through line 370 which extends to a port in the shift valve body connected to passage 371, which leads to the bore of the 3rd to 4th governor plug 129 to act on a relatively small area in opposition to governor pressure, and from the bore of this governor plug the oil continues through passage 372 to a groove 374 in the bore of the 3rd to 4th shift valve 128 and the 3rd to 4th lockout valve 130. Since in fourth speed operation the shift valve 128 has been moved to the left to its full permissible extent, as well as the valve 130, it follows that this oil supplied by the passage 372 immediately acts on the left end of the shift valve 128 and on the interior thereof to force this valve to the right to the position shown in Fig. 4, which reestablishes third speed operation in the manner described in connection with the "detent" 4th to 3rd shift. Again third speed operation will continue until the vehicle speed reaches a point making advisable a 3rd to 4th shift, at which time governor pressure, approaching pump pressure and acting on relatively large areas, will be high enough to compel this shift.

At the same time the 4th to 3rd downshift is compelled, as just described, oil advancing from the bore of the manual valve through line 370 may continue through branch 375 to a port connected with the bore of the valve stem 165 of the overrun clutch control valve, at which point it is arrested until piston 160 and valve stem 165 are moved upwardly. It should be noted at this point that when the 2nd to 3rd shift is accomplished, oil from the line 228 proceeding from the bore of the 2nd to 3rd shift valve, in addition to the course previously described, also proceeds by branch line 380 to a port in the body 150 adjacent the cylinder for piston 160. This line 380 is in effect connected to branch 381 extending to a ball check valve 382 and to restricted branch 384 connected to the bottom of the cylinder for piston 160. A bypass 385 connects branch 384 and the lower end of the ball check valve 382. The purpose of this arrangement is similar to that described in connection with the coupling lockup, i. e., to obtain a slow filling of the cylinder and, consequently, elevation or piston 160 and valve stem 165 with an attendant fast emptying thereof when the supply line 380 is connected to exhaust. Thus within a predetermined time after third speed operation has been established in Drive Range 3, the line 375 will be connected via the bore of valve 165, with the line 204 extending to the overrun clutch 80. In Drive Range 4, however, oil is not supplied to line 375 and this overrun clutch is not energized.

When the transmission has shifted to fourth speed in Drive Range 4, oil is supplied to the top of the cylinder of piston 160 through line 346, as previously described, so that oil from line 346 combines with spring 161 to force the piston 160 downwardly to its Fig. 6 position, cutting off communication between lines 204 and 375.

It follows, therefore, that when manual third speed is established by movement of the manual valve, piston 160 will be in its Fig. 6 position and will stay in this position until the downshift from fourth speed to third has been accomplished, which exhausts line 346 along with line 334 and the path therefrom, previously described. Oil in line 380, at this time available, then can enter the cylinder of piston 160, moving this piston upwardly and, after a predetermined time interval, reestablishing communication between lines 204 and 375 at the bore of the valve stem 165, which permits oil to pass through line 204 to the cylinder of piston 82 of the overrun cone brake 80, engaging the cooperating parts thereof and locking the sun gear 17 to the casing 27. The purpose of this overrun brake is to provide engine braking in the manner previously described. This overrun clutch action is not necessary in a forced detent 4th to 3rd downshift since, should the throttle pressure be relieved or the vehicle attain a high coasting speed, governor pressure will automatically cause a 3rd to 4th shift wherein engine braking is obtained.

*Drive range three*

Assuming that the vehicle is at rest and in Neutral, the manual valve can be moved to the Drive Range 3 position and operation of the vehicle in a forward direction progresses as described in connection with Drive Range 4, through first and second ratios into third ratio. Referring to Fig. 2 wherein the manual valve is shown in Drive Range 3 position, it will be seen that oil is supplied through the Drive Range 4 supply line 235 for performing the first two shifts and that oil is also supplied to the Drive Range 3 line 370 extending to the shift valve body to hold the 3rd to 4th shift valve 128 and the 3rd to 4th governor plug 129 in the Fig. 4 position. Also, the branch line 375 makes available oil at the overrun clutch control valve, to be utilized when third speed has been attained. It will be apparent that the circuits traced in connection with the manual 4th to 3rd downshift become operative when third speed is attained in Drive Range 3.

Under ordinary driving conditions, third gear ratio or speed will be the top speed attained in Drive Range 3 operation, but should excessive engine speed be approached with attendant high vehicle speed, governor pressures again will force a 3rd to 4th upshift.

*Forced third to second downshift*

Assuming that the vehicle is operating in third speed in Drive Range 3 and additional acceleration is desired, such can be obtained by movement of the throttle past full open position to force the detent plug 114 to the left in the same manner as described in connection with forced 4th to 3rd downshift. Naturally the throttle oil or line pressure supplied through line 352 to the 3rd to 4th lockout valve again is supplied thereto with no apparent effect. However, it should be noted that a branch line 400 from line 352 extends to the left end of the 3rd to 2nd detent plug 127, at which point it can move this plug to the right against governor pressure which will prevail in third speed operation. Movement of plug 127 to the right opens channel 401 in the valve body which is connected to a line 402. This line 402 continues to the left end of the double transition valve 115 and has a branch 404 which extends to the left end of the large land of this valve. The oil acting on these two surfaces has sufficient pressure to move the double transition valve to the right, reestablishing communication between line 305 from the 1st to 2nd shift valve 120 with the line 306 which continues to cause filling of the planetary coupling B to establish second speed operation.

Supply of oil to the 1st to 2nd shift valve 120 for establishing second speed is supplied from the pump supply line 182 through the restriction 302 to line 301. This restriction serves to time the normal establishment of second speed, i. e., the filling of the planetary coupling B, but, in the forced downshift now being described, a quicker filling of this coupling is desired. Accordingly, simultaneously with the movement of the 3rd to 2nd detent plug 127 to the right, oil passes through branch 600 from line 400 to the bottom of ball check valve 260, lifting the ball so that the oil at pump pressure can continue through line 259 to the right of the throttle valve regulator plug 132, which has been moved to the left by full throttle valve pressure. This oil passes into the channel 262 and some thereof will continue through the channel 601 opened by the plug 127 and extended to a port connected to restricted line 602, in turn connected to the line 301. In this fashion the line 301 receives oil through both the restrictions, with an end result that the oil supplied to the 1st to 2nd shift valve is substantially at pump pressure which will expedite establishment of direct drive in the front unit.

Movement of the 3rd to 2nd detent plug 127 also causes movement of the 2nd to 3rd shift valve 124 to the position shown in Fig. 4, which connects the line 228 to exhaust at the port 229. Since the transition from third gear to second gear requires the establishment of reduction drive in the rear unit while direct drive is being established in the front unit, it is desirable that the change in the rear unit be timed with the change in the front unit. To this end oil from line 402 also continues through branch line 410 to the left end of the 3rd to 2nd timing valve 227, moving it to the right against spring 231 and closing the port connected to line 225. Oil being exhausted from the cylinder of piston 56 of rear unit clutch 60 must pass through line 200 and branch 225, through restriction 230 to the line 228, and thence to exhaust port 229. Also band release oil in the servo for band 45 must be exhausted through the line 185, bore of the manual valve 101, and through line 200 to the branch 225 and thence as just described. So long as the timing valve 227 is maintained in its rightmost position, all oil in line 225, whether from clutch 50 or from the rear servo, must exhaust through the restriction 230 which retards such action. The exhaust of this oil will be accelerated, however, when pressure delivered to the top of the valve 145 reaches its full value, since a branch line 420 from line 306 extends to a port communicating with the bore of timing valve 227 at the right thereof. When this pressure being delivered to the top of valve 145 reaches a value approximately equal to that being supplied to the left end of the timing valve 227 by line 410, spring 231 will move this valve 227 to the left, again establishing an unrestricted passage through the bore thereof from line 225 to line 228, whereby the remaining oil in parts of the rear unit will be quickly exhausted, permitting band 45 to be applied by spring pressure to reestablish reduction drive in the rear unit.

With the transmission conditioned for reduction drive in the rear unit and direct drive in the front unit through the agency of the planetary coupling B, second speed ratio is obtained with a nicety of timing to prevent shock to the operating parts of the transmission.

While the just described operation for obtaining a 3rd to 2nd forced downshift has been related to conditions prevalent in Drive Range 3, it is to be understood that substantially the same process may occur should the transmission be operating in third speed as the result of a forced "detent" 4th to 3rd downshift in Drive Range 4. Under these circumstances the 3rd to 2nd downshift would occur only after governor pressure maintaining third speed drops sufficiently for the 3rd to 2nd detent plug 127 to be moved to the right. This sequence of shifts most likely would occur only when negotiating an extremely heavy upgrade.

*Manual third to second downshift*

Should the vehicle be operating with the transmission in third gear ratio, either as the result of normal circumstances in Drive Range 4 or Drive Range 3, the manual valve 101 can be moved to the Low position to compel a transition from third gear to second gear. When the manual valve is moved to the Low position land 105 thereof is positioned to the right of a port connected to line 450, permitting oil supplied to the bore of this valve to proceed therefrom through this line. Referring to Fig. 2, it will be seen that line 450 extends to the servo for the rear unit in position to force the exhaust valve 192 to the right against spring pressure, aligning a groove therein with a channel communicating with the chamber to the left of piston 92. A branch line 451 from line 450 extends to the left of the 2nd to 3rd auxiliary valve 125 with the pressure exerted thereon high enough to balance governor pressure in opposition thereto. When this condition is established, spring pressure and modulated throttle valve pressure will move the 2nd to 3rd shift valve to the right, connecting line 228 to the exhaust port 229. When such occurs the rear clutch 50 and the rear servo are exhausted through the paths previously described and, in addition, the double transition valve 115 has the oil at the right end thereof likewise exhausted so that pressure immediately available in line 305 from the 1st to 2nd shift valve can act on the left end of the large land of valve 115, moving it to the right to place line 305 in communication with line 306. This latter process again causes filling of the planetary coupling B in the manner previously described. Exhaust of the rear clutch 50 and of the rear servo causes a transition in the rear unit from direct drive to reduction drive since the rear servo, being spring applied, immediately causes the band 45 to be wrapped tightly about the drum 52. It will be noted in connection with the manual shift from 3rd to 2nd, as distinguished from the detent 3rd to 2nd shift, that the 3rd to 2nd timing valve remains in its Fig. 2 position during the manual shift.

It will be understood that the manual valve can be moved to the Low position at any time during the operation of the transmission, and the shift will occur below a predetermined maximum speed. In moving the manual valve to the Low position from Drive Range 4 position, Drive Range 3 position is automatically passed, so that oil under pump pressure proceeds to the 3rd to 4th shift valve train to cause a shift from fourth speed to third speed if the vehicle was in fourth speed. In this fashion advantage may be taken of the added breaking effort which obtains in second speed as distinguished from higher speeds for travel over steep downgrades. In addition, the added torque multiplication of second speed may be of advantage in travelling steep upgrades.

*Low range*

The transmission may be conditioned at any time for operation in Low range, which confines it to first and second gear ratios. For example, if the vehicle is at rest and the transmission is in Neutral, the manual valve can be moved to the Low position which will immediately cause oil to circulate in the channels supplied by line 235 for Drive Range 4 operation and also through the line 370 for Drive Range 3 operation. The latter supply of oil is effective on the 3rd to 4th valve train, rendering it incapable of causing a 3rd to 4th shift. At the same time oil proceeds through the line 450 to the 2nd to 3rd valve train, applying such pressure to the 2nd to 3rd auxiliary valve 125 as to preclude the possibility of a 2nd to 3rd shift under normal operating conditions. If the vehicle is then operated with the manual valve in this position, the transmission will function in first speed for a predetermined interval in the manner described in connection with Drive Range 4 and then automatically shift to second speed, in which speed it will remain, unless a dangerously high engine speed is reached, in which event governor pressures will compel an upshift. In this fashion engine protection is insured.

*Forced second to first downshift*

If the transmission is operating in second speed and it is desired to compel a shift to first speed for added torque multiplication, this maneuver can be accomplished by moving the throttle valve beyond full throttle position to force the detent plug 114 to the left as described in previous forced downshifts. When this occurs throttle oil at pump pressure is supplied both to the 3rd to 4th valve train and to the 2nd to 3rd valve train, as previously described, with no effect. However, oil is also supplied through the branch 460 to the left end of the 1st to 2nd governor plug 121. The pressure applied by this oil to this end of the governor plug is sufficient to overbalance the governor pressure applied to the other end thereof, with the result that modulated throttle valve pressure and spring action will force the 1st to 2nd shift valve from its left-hand position to the right-hand position as shown in Figs. 2 and 4. Such a movement of the valve immediately closes the supply line 301, which had supplied oil to cause the operation of valves to fill the planetary coupling B, and connects these various lines to exhaust so that this coupling can empty at a predetermined rate permitting reestablishment of reduction drive through the front planetary unit.

It will be apparent from the drawings that oil is supplied through line 460 to the 1st to 2nd governor plug 121 each time a forced downshift is made, but governor pressure in third and fourth speeds is high enough to prevent unfavorable action or downshift of the 1st to 2nd valve in these higher ratios.

Reverse

When the vehicle is at rest and in Neutral, the manual valve may be moved to the Reverse position which will locate land 105 of the valve to the right of the port connected with line 210 previously open to exhaust. In this position oil under pump pressure supplied by the line 182 immediately may proceed to the Drive Range 4, Drive Range 3, and Low range supply lines 235, 370 and 450 respectively, and be distributed thereby in accordance with previous descriptions. In addition, oil from the bore of the manual valve passes through line 210 to the cylinder for piston 65 of the reverse cone brake 60, moving it to lock the ring gear 41 to ground, thereby causing this element to become the reaction element of the reverse planetary unit. At the same time land 104 of manual valve 101 is positioned to the right of the bypass 184 in valve body 100, while land 102 is positioned to partially open the port connected to line 185. This situation permits oil from the pump pressure supply line 182 to proceed through the bypass 184 to the bore of the manual valve between lands 102 and 104 and from this bore through the line 185 for filling the chambers of the rear servo and releasing the band 45 in a manner previously described. The clutch 50 of the rear unit is exhausted through the line 200 into the bore of the manual valve body to the left of land 102. This operation conditions the rear unit as in Neutral, with each element being free to rotate as compelled.

Simultaneously, oil is supplied from branch 470 of line 210 to the regulator valves to pump 170, changing the capacity thereof so that delivered pressure of the pump is materially higher than in any of the forward driving ranges. A branch 471 introduces oil from branch 470 to the right end of the compensator valve 116, forcing it to the left and cutting off the supply of oil under pump pressure available through line 256. This action assures that compensator pressure will not be developed to act on the pistons of the rear servo.

The transmission is now conditioned for reverse drive, which will be obtained by advancing the engine throttle. Inasmuch as the planetary coupling B is exhausted, the front unit is compelled to operate in reduction drive which is transmitted to the sun gear 34 of the rear unit and from it through the other elements of the rear unit and the elements of the planetary unit to cause reverse rotation of output shaft 38 in the manner described in connection with Fig. 1. The added pump pressure developed by pump 170 is needed to assure that the reverse cone 60 will be held against rotation under the added reaction load.

Inasmuch as the Low and Reverse positions of the manual lever are in close proximity, it is possible to cause rocking of the car under light throttle by merely moving the control lever to shift the manual valve from one position to the other. So long as predetermined speeds in either direction are not exceeded, this maneuver can be accomplished to assist in difficult driving conditions, such as mud, snow and sand.

The exhaust valve 192 is of particular advantage in this rocking maneuver since it effectively bypasses the reed valve 190, permitting a rapid fill and empty of the servo chambers to quickly apply or release the band 45.

When the engine is stopped, oil pressure supplied to the bottom of the exhaust valve 181 quickly drops so that this valve can be moved downwardly under spring pressure. When this occurs the branch line 183 is opened to exhaust above the top of the valve 181, permitting the oil in the system beyond that point to be drained without being returned to either the front or rear pumps. In this fashion the pressure in line 215 can fall quickly so that the parking pawl 217 is no longer held in one position by the piston 216.

From the foregoing it will be seen that the present invention provides an improved plural step ratio transmission in which shift from one gear ratio to another can be made with extreme smoothness due to the coaction between the planetary fluid coupling and the one-way brake associated with the sun gear of the planetary unit. The fluid coupling provides what amounts to an infinite variation in torque transmission to couple elements of the planetary unit together for direct drive and, at the same time, permits the unit to revert to reduction drive without shock. It will be understood that the invention can be modified beyond the illustrated embodiment, and therefore any limitations to be imposed are those set forth in the following claims.

What is claimed is:

1. In a plural step ratio transmission for a throttle controlled engine, said transmission providing a plurality of forward speed ratios, a gear unit comprising a driving element, a driven element and a reaction element, brake means for holding said reaction element against rotation in one direction to establish geared reduction drive in said unit between said driving and driven elements, a source of liquid under pressure, a throttle valve regulating pressure from said source in accordance with throttle position, a governor regulating pressure from said source in accordance with the speed of the output of said transmission, a fluid coupling having its pump connected to one of said elements and its turbine connected to another of said elements, said coupling when filled with liquid transmitting torque between the two elements connected thereto for establishing substantially direct drive through said unit between said driving and driven elements with all of said elements rotating substantially in unison, said fluid coupling being emptied when said reaction element is held against rotation, and valve means jointly controlled by pressure from said throttle valve and said governor for causing successive filling and emptying of said coupling.

2. In a plural step ratio transmission for a throttle controlled engine, said transmission providing a plurality of forward speed ratios, a gear unit comprising a driving element, a driven element and a reaction element, brake means for holding said reaction element against rotation in one direction to establish geared reduction drive in said unit between said driving and driven elements, a source of liquid under pressure, a throttle valve regulating pressure from said source in accordance with throttle position, a governor regulating pressure from said source in accordance with the speed of the output of said transmission, a fluid coupling having its pump connected to one of said elements and its turbine connected to another of said elements, said coupling when filled with liquid transmitting torque between the two elements connected thereto for establishing substantially direct drive through said unit between said driving and driven elements with all of said elements rotating substantially in unison, said fluid coupling being emptied when said reaction element is held against rotation, means under the joint control of pressure from said throttle valve and said governor for causing successive filling and emptying of said coupling, a hydraulically operated brake for locking said reaction element against rotation in either direction, and manually controlled means for applying said hydraulically operated brake when said fluid coupling is emptied in one established speed ratio of said transmission.

3. In a plural step ratio transmission for a throttle controlled engine, said transmission providing a plurality of forward speed ratios, a gear unit comprising a driving element, a driven element and a reaction element, brake means for holding said reaction element against rotation in one direction to establish geared reduction drive in said unit between said driving and driven elements, a source of liquid under pressure, a throttle valve regulating pressure from said source in accordance with throttle position, a governor regulating pressure from said source in accordance with the speed of the output of said transmission, a fluid coupling having its pump connected to said driving element and its turbine connected to said reaction element for transmitting torque between the two elements connected thereto, means under the joint control of pressure from said throttle valve and from said governor for filling said coupling with liquid to initiate and progressively accelerate rotation of said reaction element thereby to establish substantially direct drive through said unit between said driving and driven elements, and for emptying said fluid coupling to cause progressive deceleration of said reaction element until said reaction element comes to rest and is held against rotation in said one direction to successively establish direct drive and drive at a speed ratio other than direct drive in said unit as said transmission is conditioned for successively higher speed ratios.

4. In a plural step ratio transmission for a throttle controlled engine, said transmission providing a plurality of forward speed ratios, a gear unit comprising a driving element, a driven element and a reaction element, brake means for holding said reaction element against rotation in one direction to establish geared reduction drive in said unit between said driving and driven elements, a source of liquid under pressure, a throttle valve regulating pressure from said source in accordance with throttle position, a governor regulating pressure from said source in accordance with the speed of the output of said transmission, a fluid coupling having its pump connected to said driving element and its turbine connected to said reaction element for transmitting torque between the two elements connected thereto, means under the joint control of pressure from said throttle valve and said governor for filling said coupling with liquid to initiate and progressively accelerate rotation of said reaction element thereby to establish substantially direct drive through said unit between said driving and driven elements, and for emptying said fluid coupling to cause progressive deceleration of said reaction element until said reaction element comes to rest and is held against rotation in said one direction to successively establish direct drive and speed ratios other than direct drive in said unit as said transmission is conditioned for successively higher speed ratios, a hydraulically operated brake for locking said reaction element against rotation in either direction, and manually controlled means for applying said hydraulically operated brake when said fluid coupling is emptied in one established speed ratio of said transmission.

5. In a plural step ratio transmission, a liquid pump, a gear unit comprising a driving element, a driven element and a reaction element, brake means for holding said reaction element against rotation in one direction to establish geared drive in said unit between said driving and driven elements at a speed ratio other than direct drive, a fluid coupling having its pump connected to said driving element and its turbine connected to said reaction element, said coupling when filled with liquid transmitting torque between the two elements connected thereto for establishing substantially direct drive through said unit between said driving and driven elements, a valve for connecting said coupling to the outlet of said liquid pump to fill said coupling, a second valve sensitive to the pressure of the liquid outlet of said pump for arresting supply of liquid to said first valve when the pressure of said liquid pump outlet falls below a predetermined minimum, and means for emptying said fluid coupling to cause said reaction element to be held against rotation in said one direction.

6. In a plural step ratio transmission, first and second gear units, each comprising a driving element, a driven element and a reaction element, a first fluid coupling having its pump connected to the driven element of the first unit and its turbine connected to the driving element of the second unit, brake devices for holding said reaction elements to cause them to establish reaction in the respective units, a clutch for establishing substantially direct drive in said second unit, a second fluid coupling having its pump connected to one element of said first unit and its turbine connected to another element of said first unit, a source of liquid under pressure, valve means for supplying liquid from said source to said coupling and for exhausting liquid from said coupling, and additional valve means for operating said last mentioned valve means to selectively establish substantially direct drive in said first unit by filling said coupling and for emptying said coupling when said reaction member of said first unit establishes reaction therein.

7. In a plural step ratio transmission for transmitting torque from a source of motive power to a drive shaft, first and second gear units, each comprising a driving element, a driven element and a reaction element, a first fluid coupling having its pump connected to the driven element of the first unit and its turbine connected to the driving element of the second unit, a one-way brake for holding the reaction element of said first unit to cause it to establish reaction therein, a brake device for the reaction element of said second unit to cause it to establish reaction therein, a clutch for establishing substantially direct drive in said second unit, a second fluid coupling having its pump connected to one element of said first unit and its turbine connected to another element of said first unit, a source of liquid under pressure, valve means for supplying liquid from said source to said coupling and for exhausting liquid from said coupling, and additional valve means for operating said last mentioned valve means to selectively establish substantially direct drive in said first unit by filling said coupling and for emptying said coupling when said reaction member of said first unit establishes reaction therein, said additional valve means controlling actuation of said brake device and said clutch for selectively establishing geared drive at a speed ratio other than direct drive and substantially direct drive in said second unit.

8. In a plural step ratio transmission for transmitting torque from a source of motive power to a drive shaft, first and second gear units, each comprising a driving element, a driven element and a reaction element, a first fluid coupling having its pump connected to the driven element of the first unit and its turbine connected to the driving element of the second unit, a one-way brake for holding the reaction element of said first unit to cause it to establish reaction therein, a brake device for the reaction element of said second unit to cause it to establish reaction therein, a clutch for establishing substantially direct drive in said second unit, a second fluid coupling having its pump connected to one element of said first unit and its turbine connected to another element of said first unit, a source of liquid under pressure, valve means for supplying liquid from said source to said coupling and for exhausting liquid from said coupling, additional valve means for operating said last mentioned valve means to selectively establish substantially direct drive in said first unit by filling said coupling and for emptying said coupling when said reaction member of said first unit establishes reaction therein, said additional valve means controlling actuation of said brake device and said clutch for selectively establishing geared drive at a speed ratio other than direct drive and substantially direct drive in said second unit, a hydraulically operated brake for holding said reaction element of the first unit against rotation in either direction, and manually controlled means for selectively causing actuation of said hydraulically operated brake when said second unit is in substantially direct drive condition and said second fluid coupling is emptied.

9. In a plural step ratio transmission for transmitting torque from a source of motive power to a drive shaft, first and second gear units, each comprising a driving element, a driven element and a reaction element, a fluid coupling having its pump connected to the driven element of the first unit and its turbine connected to the driving element of the second unit, a one-way brake for holding the reaction element of said first unit to cause it to establish reaction therein, a brake device for the reaction element of said second unit to cause it to establish reaction therein, a clutch for establishing substantially direct drive in said second unit, a second fluid coupling having its pump connected to the driving element of said first unit and its turbine connected to the reaction element of said first unit, a source of liquid under pressure, control valve means for supplying liquid from said source to said coupling and for exhausting liquid from said coupling, and additional valve means for operating said control valve means to selectively establish substantially direct drive in said first unit by filling said coupling and for emptying said coupling to cause progressive deceleration of the reaction element of said first unit until it comes to rest and is held against reverse rotation by said one-way brake thereby to establish reaction in said first unit.

10. In a plural step ratio transmission for transmitting torque from a source of motive power to a drive shaft, first and second gear units, each comprising a driving element, a driven element and a reaction element, a fluid coupling having its pump connected to the driven element of the first unit and its turbine connected to the driving element of the second unit, a one-way brake for holding the reaction element of said first unit to cause it to establish reaction therein, a brake device for the reaction element of said second unit to cause it to establish reaction therein, a clutch for establishing substantially direct drive in said second unit, a second fluid coupling having its pump connected to the driving element of said first unit and its turbine connected to the reaction element of said first unit, a source of liquid under pressure, control valve means for supplying liquid from said source to said coupling and for exhausting liquid from said coupling, additional valve means for operating said control valve means to selectively establish substantially direct drive in said first unit by filling said coupling and for emptying said coupling to cause progressive deceleration of the reaction element of said first unit until it comes to rest and is held against reverse rotation by said one-way brake thereby to establish reaction in said first unit, a hydraulically operated brake for holding said reaction element of the first unit against rotation in either direction, and manually controlled means for selectively causing actuation of said hydraulically operated brake when said second unit is in substantially direct drive condition and said second fluid coupling is emptied.

11. In a plural step ratio transmission, first and second gear units, each comprising a driving element, a driven element and a reaction element, a first fluid coupling having its pump connected to the driven element of the first unit and its turbine connected to the driving element of the second unit, brake devices for holding said reaction elements to cause them to establish reaction in the respective units, a clutch for establishing substantially direct drive in said second unit, a second fluid coupling having its pump connected to the driving element of said first unit and its turbine connected to the reaction element of said first unit, a source of liquid under pressure, control valve means for supplying liquid from said source to said coupling and for exhausting liquid from said coupling, additional valve means for operating said last mentioned valve means to selectively establish substantially direct drive in said first unit by filling said coupling and for emptying said coupling to establish reaction in said first unit, and a limit valve sensitive to the delivered liquid pressure from said source to interrupt supply of liquid to said control valve when the delivered pressure falls below a predetermined minimum.

12. In a plural step ratio transmission, first and second gear units, each comprising a driving element, a driven element and a reaction element, a first fluid coupling having its pump connected to the driven element of the first unit and its turbine connected to the driving element of the second unit, brake devices for holding said reaction elements to cause them to establish reaction in the respective units, a clutch for establishing substantially direct drive in said second unit, a second fluid coupling having its pump connected to the driving element of said first unit and its turbine connected to the reaction element of said first unit, a source of liquid under pressure, control valve means for supplying liquid from said source to said coupling and for exhausting liquid from said coupling, additional valve means for operating said last mentioned valve means to selectively establish substantially direct drive in said first unit by filling said coupling and for emptying said coupling to establish reaction in said first unit, a limit valve sensitive to the delivered liquid pressure from said source to interrupt supply of liquid to said control valve when the delivered pressure falls below a predetermined minimum, a hydraulically operated brake for holding said reaction element of the first unit against rotation in either direction, and manually controlled means for selectively causing actuation of said hydraulically operated brake when said second unit is in substantially direct drive condition and said second fluid coupling is emptied.

References Cited in the file of this patent
UNITED STATES PATENTS

| Number | Name | Date |
| --- | --- | --- |
| 2,351,213 | James | June 13, 1944 |
| 2,437,333 | Pollard | Mar. 9, 1948 |
| 2,515,831 | McFarland | July 18, 1950 |
| 2,645,135 | Frank | July 14, 1953 |
| 2,664,765 | Kellel | Jan. 5, 1954 |
| 2,687,657 | Kugel et al. | Aug. 31, 1954 |